United States Patent Office 3,258,076
Patented June 28, 1966

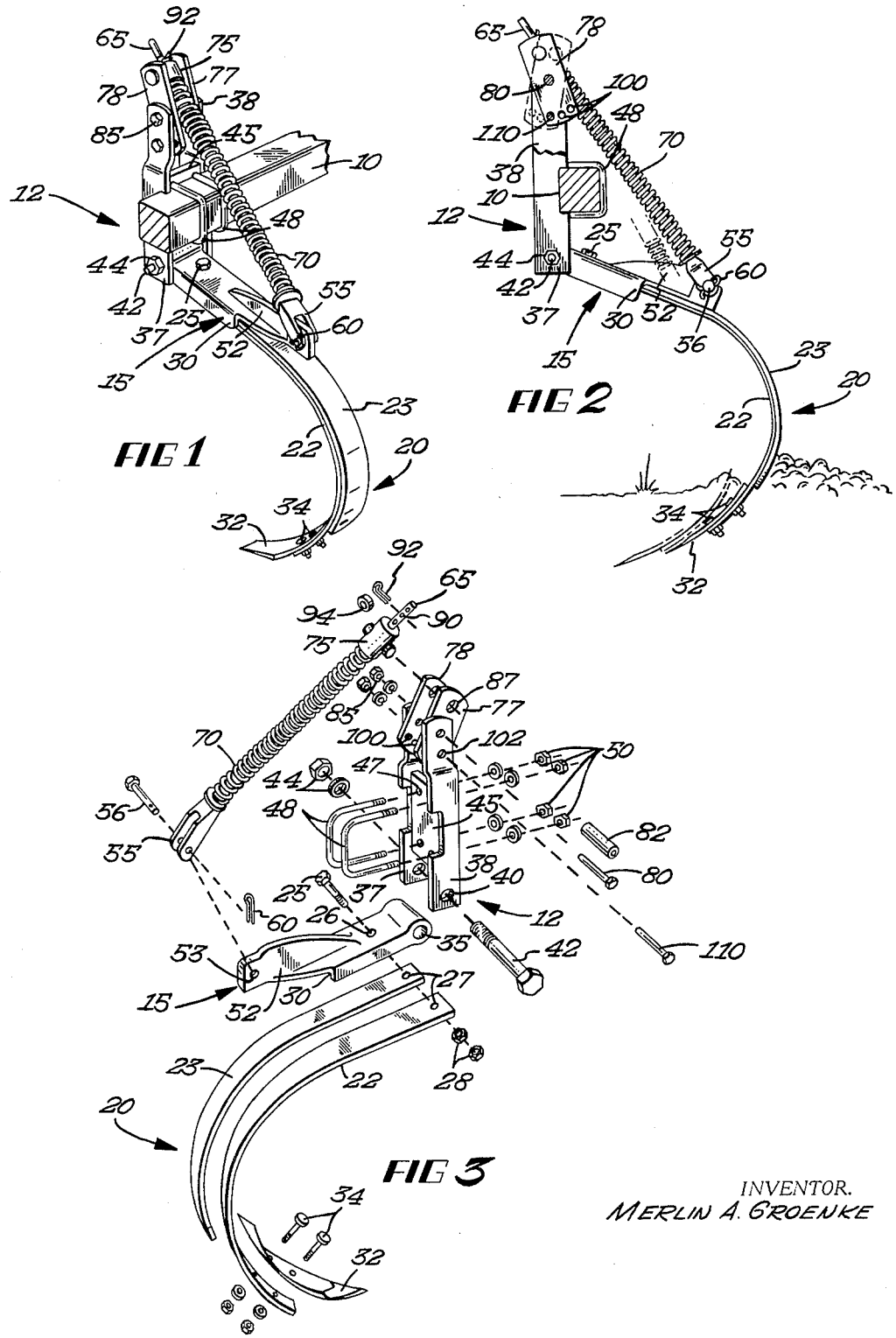

3,258,076
ADJUSTABLE SPRING CLAMP SHANK ASSEMBLY
Merlin A. Groenke, Glencoe, Minn., assignor to Portable Elevator Manufacturing Company, Bloomington, Ill., a corporation of Illinois
Filed Oct. 7, 1964, Ser. No. 402,187
5 Claims. (Cl. 172—710)

This invention relates to mounting assemblies for cultivating tools and more particularly to an improved adjustable spring clamp shank assembly used in mounting cultivating tools.

Cultivating tool mounting assemblies have in the past taken varied forms and utilized varied degrees and types of adjustment. Because of the varied soil conditions encountered and further because of obstructions, such as rocks, engaged by cultivating tools, it has been necessary to provide in such mounting assemblies provisions for adjustment of the depth of the cultivating tool to meet varying soil conditions and, in addition, a spring biased mounting for the tool to permit it to swing clear of the obstructions when they are encountered in a cultivating operation to prevent breakage of the tool or shovel. Since a plurality of cultivating tools or the equivalent are used in the cultivating operation on a single machine, they are normally mounted in a ganged relationship with provision for simultaneously adjusting all tools or all tools mounted on the same support element of the cultivating apparatus. This arrangement increases the complexity of the cultivating machine and does not provide a versatile tool mounting assembly or shank clamping assembly which may be used in varying cultivating apparatus. Where each of the cultivating tool mounting assemblies have provisions for adjustability of depth of the cultivating tool, the structure incorporated has been so complex as to make such aparatus difficult to use and expensive to own and maintain.

The present invention is directed to a simplified cultivating tool mounting assembly or an adjustable spring clamp shank assembly which is extremely simple in design and provides for a limited range of depth adjustment suitable for most soil conditions. This simplified spring clamp shank assembly is capable of incorporation on all types of cultivating apparatus such as to have universal application and is economical to manufacture and maintain making it readily available for all such equipments and uses. The present invention provides an adjustable spring clamp shank assembly by means of which the individual cultivating tool may be adjusted in depth through a simplified mounting arrangement, and the tool may also be preloaded and biased to permit the tool to swing free from obstructions and operate under varying soil conditions. This simplified shank mounting assembly provides for individual adjustment of each tool which under normal circumstances is satisfactory for farm operation since the individual tool when adjusted will be operated through substantially the same soil conditions without need for further adjustments. It does, however, permit adjustment of the tool setting to accommodate varying soil conditions without requiring a specialized cultivator design or expensive and complicated individual tool mounting assemblies.

It is therefore, an object of this invention to provide an improved cultivating tool mounting assembly.

Another object of this invention is to provide an improved adjustable spring clamp shank assembly which may be adjusted for varying depth conditions of the cultivating tool and biased to permit the tool to swing clear of obstructions.

A further object of this invention is to provide an improved spring clamp shank mounting assembly which is simplified in design, economical to manufacture, readily adjustable and easy to maintain.

These and other objects of this invention will become apparent from a reading of the attached description together with the drawings wherein:

FIGURE 1 is a perspective view of the improved adjustable spring clamp shank assembly, FIGURE 2 is a side elevation view of the improved adjustable spring clamp shank assembly with parts broken away and, FIGURE 3 is an exploded view of the improved adjustable clamp shank assembly.

As will be seen in FIGURES 1 and 2, the improved adjustable spring clamp shank assembly is adapted to be mounted on and supported by an elongated support member or frame, indicated generally at 10, which is normally a part of a cultivating apparatus. This frame would normally extend within the cultivating apparatus transversely of the same and support a plurality of such tools in the ganged relationship or with several of such frames having tool mounting assemblies thereon positioned in adjacent relationship to perform the cultivating operation. Although not shown, it will be understood that such a frame or support member would normally be pivoted on such cultivating apparatus for the purpose of lifting the tools between a working and a tool raised position.

The improved spring clamp shank assembly is comprised basically of a connecting frame 12 which is mounted on the supporting member of frame 10 and which pivotally mounts a support member 15 to which is connected the cultivating tool or shovel assembly indicated generally at 20. The support member 15 is adapted to mount the shank end of the cultivating tool which is formed of a main shank leaf 22 and a helper shank leaf 23. These leaves are positioned in overlying relationship and attached to the under surface of support member 15 through suitable screw means 25 which threads through apertures 26 and 27 in the support member and the leaves respectively and is secured thereon by lock nuts and washers 28. The under surface of the support member 15 is channeled or flanged, such as indicated at 30, and rigidly supports the sides of the leaves to prevent translational movement of the same. The free extremity of the main shank leaf mounts the tool tip or shovel 32 which is secured to the shank leaf 32 through suitable nut and bolt means 34. Support member 15 is pivotally mounted on the connecting frame 12 through a pivot section 35 included in one extremity of the support member. This pivot section is generally cylindrical in form and fits between side plates 37, 38 of the connecting frame 12 and aligns with apertures 40 in the extremities of the side plates 37, 38 to be pivotally mounted thereon by means of a bolt 42 extending through the apertures and pivot means. The bolt 42 is held in position by means of a lock nut and washer 44. Side plates 37, 38 of the connecting frame 12 are held in a spaced relationship by means of a connecting plate 45 positioned intermediate the extent of the side plates and normally formed integral therewith. The connecting plate includes a plurality of apertures 47 through which a pair of U-bolts 48 extend to fit around the frame or support 10 and be secured to the connecting frame through nut and bolt means 50.

The opposite extremity of this tool support member 15 is defined by a raised ribbed section 52 terminating in a portion having an aperture 53 therein around which is positioned a clevis 55 to be secured thereon by means of a connecting pin 56 and a cotter-key or equivalent retaining member 60. The clevis 55 mounts a pressure rod 65 which is pivotally supported through the clevis at one extremity thereof and has a compression spring 70 encircling the same. The free extremity of the pressure rod is positioned in a slidable guide support 75 which is pivotally mounted on a pair of guide support plates or side portions 77, 78. The plates 77, 78 in turn are journaled on the opposite extremity of the side plates 37, 38 through a pivot pin 80. Mounted on the pivot pin is a spacer member 82 which fits between the guide support plates 77, 78 to maintain the spacing of this extremity of the connecting frame with the guide support member 75. Pin 80 carries a threaded extremity which mounts securing nuts and washers 85 to retain the same therein. The pivoted guide support member 75 is pivotally mounted on the plates through a pivot structure indicated at 87. The free extremity of the pressure rod 65 extending beyond the guide member 75 includes a plurality of apertures 90 through which a cotter-key 92 is positioned with a washer 94 ahead of the same for the purpose of spring loading the compression spring 70 encircling the pressure rod.

In the assembled relationship, the adjustable spring clamp shank assembly is mounted on the support member or frame 10 as indicated in FIGURE 1. The biasing pressure for the support member in its pivotal mounting on the connecting frame 12 is adjusted by positioning the extremity of the rod 65 through the guide support 75 and compressing the spring to preload the same. The washer 94 and cotter-key 90 are positioned on the rod with a cotter-key extending through one of the apertures 90 therein to retain the spring in the compressed relationship. This mounting structure permits the pressure rod to slide through the guide support 75 and compress the spring 70 as obstructions are engaged by the cultivating tool causing the support member 15 to pivot on the connecting frame 12. The preload is adjusted by positioning the cotter-key 92 in one of the apertures 90 to vary the compression of the spring in accordance with varying soil conditions to be encountered by the cultivating tool. The simplified adjustment of depth of the cultivating tool is obtained through the plurality of apertures 100 in the plates 77, 78 of the guide support which align with an aperture 102 in the side plates 37, 38 of the connecting frame. Suitable pin means 110 fit through these holes which permit a relative positioning of the side plates 77, 78 relative to the plates 37, 38 of the connecting frame. This adjusts the position of the guide support 75 with respect to the connecting frame 12 to vary the position of the support member 15 therewith. Thus the cultivating tools connected through the support member 15 are adjusted in depth with the rotation of the plates 77, 78 on the connecting frame 12. The plurality of holes 100 in the plates 77, 78 and the cooperating hole 102 or a plurality of holes, if desired, in the side plates 37, 38 permit a range of adjustment of the cultivating tools with respect to the connecting frame sufficient to accommodate most soil conditions encountered. Such adjustment is made normally upon initial usage of the cultivating machine when the soil conditions are determined and the operation of the cultivating tool in the cultivating process is determined. Each individual shank assembly is adjusted similarly to provide the same depth of cultivation for the type of soil encountered. Since such conditions do not normally change within the area in which the cultivating apparatus is used, such as on a particular farm, initial adjustment is all that is required. However, this simplified arrangement does permit the cultivator to be easily and simply adjusted for the soil conditions and to be separately preloaded for such soil conditions so that a satisfactory cultivating operation will be obtained and permits a tool of a different type and size to be substituted for the tool 32 and thereafter preloaded so as to operate at the proper depth, depending again upon soil conditions. The improved adjustment feature of the spring clamp shank assembly provides a relatively simple arrangement for mounting the cultivating tool in a desired manner and does not require a complex cultivating apparatus or complex tool mounting structure. As such, the cost of manufacture of the improved shank assembly is sufficiently reduced as to make it readily available for all equipments and purchasers of relatively limited means.

In considering this invention it should be remembered that the present disclosure intends to be illustrative only and the scope of the invention should be determined by the appended claims.

What is claimed is:

1. An adjustable spring clamp shank assembly comprising, a tool support, a cultivating tool adapted to be mounted on a surface of said tool support, a connecting frame member including a pair of spaced side plates and a transversely extending connecting plate positioned between and integrally connected thereto, means included in part in said connecting plate of said connecting frame member for attaching said shank assembly on a transverse support member of a cultivator, journal means included in part on one extremity of said connecting frame member and on one extremity of said tool support for pivotally mounting the tool support on the connecting frame member, a pressure rod, clevis means pivotally connecting the pressure rod to the opposite extremity of the tool support remote from said journal means, a guide support having side portions pivotally mounted on the spaced side plates of the connecting frame member at the opposite extremity of the connecting frame member, guide means pivotally mounted on the guide support being fitted over to slidably mount the pressure rod on said guide support, spring means encircling the pressure rod and bearing against the clevis means and the guide means, and means included in part in the side plates of the connecting frame and in part in the side portions of the guide support adjustably mounting and positioning the guide support on the connecting frame to adjustably position the cultivating tool on the tool support relative to the connecting frame member, said means included in part in the side plates of the connecting frame and in part in said portions of the guide support being apertures in the side plates and in said portions of the guide support which align when the guide means is pivoted on the guide support with screw means positioned through the apertures to maintain the guide support on said connecting frame member in an adjusted relative position.

2. An adjustable spring clamp shank assembly comprising, a tool support, means included in said tool support for mounting a cultivating tool on a surface of the tool support, a connecting frame including a pair of spaced side plates and a transversely extending connecting portion positioned between and connected thereto, means included in part in said connecting portion of said connecting frame adapted to mount said shank assembly on a transverse support member of a cultivator, means pivotally mounting the tool support at one extremity thereof on one extremity of said connecting frame member, guide means positioned at the opposite extremity of the connecting frame, a guide rod and a biasing spring connected to the other extremity of the tool support and extending to the guide means for guiding the tool support for pivotal movement relative to the connecting frame and biasing such pivotal movement, plate means positioned on either side of said guide means and pivotal mounting said guide means to adjustably position the guide means with respect to the connecting frame, means mounting the plate means in varied positions on the connecting frame, said means mounting the plate means on the connecting frame including apertures in the plate means and in the side plates of the connecting frame and pin means positioned through the apertures for holding the plate means fixed to the spaced side plates of the connecting frame.

3. An adjustable spring clamp shank assembly comprising, a tool support, a cultivating tool mounted on a surface of the tool support, a connecting frame member including a pair of spaced side plates, means connected to the connecting frame member for attaching the shank assembly to a supporting member of a cultivator, journal means mounting the tool support for pivotal movement on one extremity of the connecting frame member, a pressure rod, means pivotally connecting the pressure rod to the tool support remote from said journal means, a guide support having side portions pivotally mounted on the spaced side plates of the connecting frame member at the extremity of the connecting frame member remote from the tool support, guide means pivotally mounted on the guide support and slidably mounting the pressure rod on the guide support, bias means associated with the pressure rod and biasing the tool support away from the guide means, and apertures in the side portions of the guide support and in the spaced side plates of the connecting frame member adapted to align and receive screw means therein to adjustably position the guide support relative to the connecting frame member to adjustably position the tool support relative to the connecting frame member.

4. An adjustable spring clamp shank assembly comprising, a tool support, a cultivating tool adapted to be mounted on a surface of said tool support, a connecting frame member including means thereon adapted to mount the frame member on a transverse support portion of a cultivator, journal means included in part at one extremity of the connecting frame member and on one extremity of the tool support for pivotally mounting the tool support on the connecting frame member, a pressure rod, means pivotally connecting the pressure rod to the extremity of the tool support remote from the journal means, a guide support pivotally mounted on the other extremity of the connecting frame member, guide means pivotally mounted on the guide support and slidably mounting the pressure rod, spring means associated with the pressure rod and positioned between the guide means and the tool support for biasing the tool support away from the guide means, and means included in the other extremity of the connecting frame member and in the guide support for adjustably positioning the cultivating tool on the tool support relative to the connecting frame member, said means being apertures in the connecting frame member and the guide support and pin means positioned through the apertures to maintain the guide support on the connecting frame member in an adjusted position.

5. An adjustable spring clamp shank assembly comprising, a tool support, means included in the tool support for mounting a cultivating tool on a surface of the tool support, a connecting frame member including a transversely extending portion adapted to mount the shank assembly on a transverse support member of a cultivator, means pivotally mounting the tool support at one extremity of the connecting frame member, guide means positioned at the other extremity of the connecting frame member, a guide rod and biasing spring connected to the extremity of the tool support remote from the pivotally mounting means and extending to the guide means for guiding the tool support for pivotal movement relative to the connecting frame and biasing such pivotal movement, plate means pivotally mounting the guide means on the connecting frame member remote from the tool support to adjustably position the guide means with respect to the connecting frame member, means mounting the plate means in varied positions on the connecting frame, said last named means including apertures in the plate means and in the extremity of the connecting frame member remote from the journal means together with pin means positioned through the apertures for holding the plate means fixed on the connecting frame member.

References Cited by the Examiner

UNITED STATES PATENTS

| 2,498,887 | 2/1950 | Hyland | 172—739 X |
| 2,679,793 | 6/1954 | Rolf et al. | 172—462 X |
| 3,098,529 | 7/1963 | Wade et al. | 172—710 X |

FOREIGN PATENTS

| 1,129,076 | 1/1957 | France. |
| 873,241 | 7/1961 | Great Britain. |

ABRAHAM G. STONE, *Primary Examiner.*

T. GRAHAM CRAVER, *Examiner.*

J. R. OAKS, *Assistant Examiner.*